United States Patent
Sanchez

(10) Patent No.: US 10,062,071 B2
(45) Date of Patent: Aug. 28, 2018

(54) SYSTEMS AND METHODS FOR FACILITATING ITEM SEARCHING AND LINKING TRANSACTIONS FUNCTIONALITY IN MOBILE COMMERCE

(71) Applicant: FIRST DATA CORPORATION, Greenwood Village, CO (US)

(72) Inventor: J. Scott Sanchez, Atlanta, GA (US)

(73) Assignee: First Data Corporation, Grenwood Village, CO (US)

( * ) Notice: Subject to any disclaimer, the term of this patent is extended or adjusted under 35 U.S.C. 154(b) by 709 days.

(21) Appl. No.: 14/024,287

(22) Filed: Sep. 11, 2013

(65) Prior Publication Data

US 2014/0074658 A1    Mar. 13, 2014

Related U.S. Application Data

(60) Provisional application No. 61/799,676, filed on Mar. 15, 2013, provisional application No. 61/699,728, filed on Sep. 11, 2012.

(51) Int. Cl.

| | |
|---|---|
| G06Q 20/10 | (2012.01) |
| G06Q 20/32 | (2012.01) |
| G06Q 20/40 | (2012.01) |
| G06Q 30/02 | (2012.01) |
| G06Q 30/06 | (2012.01) |
| G06Q 20/02 | (2012.01) |
| G06Q 20/20 | (2012.01) |
| H04L 29/06 | (2006.01) |
| G06Q 20/24 | (2012.01) |

(Continued)

(52) U.S. Cl.
CPC ......... *G06Q 20/3223* (2013.01); *G06Q 20/02* (2013.01); *G06Q 20/102* (2013.01); *G06Q 20/204* (2013.01); *G06Q 20/24* (2013.01); *G06Q 20/3224* (2013.01); *G06Q 20/3276* (2013.01); *G06Q 20/3278* (2013.01); *G06Q 20/40* (2013.01); *G06Q 20/4037* (2013.01); *G06Q 20/42* (2013.01); *G06Q 30/0222* (2013.01); *G06Q 30/0233* (2013.01); *G06Q 30/0267* (2013.01); *G06Q 30/0625* (2013.01); *G06Q 30/0633* (2013.01); *G06Q 40/025* (2013.01); *H04L 63/083* (2013.01)

(58) Field of Classification Search
CPC .............................. G06Q 30/00; G06Q 20/10
USPC .............................. 705/26.62, 40, 26.7, 27.1
See application file for complete search history.

(56) References Cited

U.S. PATENT DOCUMENTS

| | | | |
|---|---|---|---|
| 6,249,773 B1 * | 6/2001 | Allard .................... | G06Q 30/06 |
| | | | 705/26.8 |
| 6,873,967 B1 * | 3/2005 | Kalagnanam .......... | G06Q 30/02 |
| | | | 705/26.44 |

(Continued)

*Primary Examiner* — Oluseye Iwarere
(74) *Attorney, Agent, or Firm* — Eversheds-Sutherland (US) LLP

(57) ABSTRACT

This disclosure describes systems, methods, and computer-readable media related to facilitating item searching and linking transactions functionality in mobile commerce. In some embodiments, a user device may receive an identification of an item from a user. The user device may receive one or more search parameters. The user device may facilitate a search for the item based at least in part on the identification of the item and the one or more search parameters. The user device may insert the item into a lifecycle shopping list. The user device may store the lifecycle shopping list.

22 Claims, 5 Drawing Sheets

(51) Int. Cl.
*G06Q 20/42* (2012.01)
*G06Q 40/02* (2012.01)

(56) References Cited

U.S. PATENT DOCUMENTS

| | | | | |
|---|---|---|---|---|
| 7,756,757 | B1* | 7/2010 | Oakes, III | G06Q 10/047 |
| | | | | 705/26.1 |
| 7,974,889 | B2* | 7/2011 | Raimbeault | G06Q 20/208 |
| | | | | 705/26.7 |
| 9,129,332 | B1* | 9/2015 | Oakes, III | G06Q 30/0639 |
| 2002/0016734 | A1* | 2/2002 | McGill | G06Q 30/02 |
| | | | | 705/14.39 |
| 2002/0156685 | A1* | 10/2002 | Ehrlich | G06Q 30/02 |
| | | | | 705/26.41 |
| 2003/0144911 | A1* | 7/2003 | Lin-Hendel | G06Q 10/02 |
| | | | | 705/26.1 |
| 2005/0075940 | A1* | 4/2005 | DeAngelis | G06Q 30/02 |
| | | | | 705/26.1 |
| 2006/0175403 | A1* | 8/2006 | Fossen McConnell | |
| | | | | G06Q 30/02 |
| | | | | 235/385 |
| 2008/0059302 | A1* | 3/2008 | Fordyce, III | G06Q 30/00 |
| | | | | 705/14.13 |
| 2010/0082447 | A1* | 4/2010 | Lin | G06Q 30/0601 |
| | | | | 705/26.1 |
| 2010/0205045 | A1* | 8/2010 | Zhang | G06Q 30/02 |
| | | | | 705/14.1 |
| 2011/0055289 | A1* | 3/2011 | Ennis | G06Q 10/06 |
| | | | | 707/805 |
| 2011/0178861 | A1* | 7/2011 | Georgi | G06Q 30/0224 |
| | | | | 705/14.25 |
| 2011/0251897 | A1* | 10/2011 | Litvack | G06Q 30/02 |
| | | | | 705/14.58 |
| 2012/0072303 | A1* | 3/2012 | Brown | G06Q 30/0206 |
| | | | | 705/26.8 |
| 2012/0084122 | A1* | 4/2012 | Boehle | G06Q 30/06 |
| | | | | 705/14.1 |
| 2012/0179516 | A1* | 7/2012 | Fakhrai | G06Q 30/08 |
| | | | | 705/14.1 |
| 2012/0226588 | A1* | 9/2012 | Wuhrer | G06Q 30/06 |
| | | | | 705/27.1 |
| 2012/0239504 | A1* | 9/2012 | Curlander | G06Q 30/02 |
| | | | | 705/14.66 |
| 2012/0303479 | A1* | 11/2012 | Derks | G06Q 30/00 |
| | | | | 705/26.8 |
| 2013/0006788 | A1* | 1/2013 | Zhou | G06Q 50/01 |
| | | | | 705/26.1 |
| 2013/0006816 | A1* | 1/2013 | Nuzzi | G06Q 30/0261 |
| | | | | 705/27.1 |
| 2013/0046648 | A1* | 2/2013 | Calman | G06Q 30/08 |
| | | | | 705/26.3 |
| 2013/0066740 | A1* | 3/2013 | Ouimet | G06Q 30/06 |
| | | | | 705/26.7 |
| 2013/0275213 | A1* | 10/2013 | Huang | G06Q 30/0255 |
| | | | | 705/14.53 |
| 2013/0339190 | A1* | 12/2013 | Yu | G06Q 30/0633 |
| | | | | 705/26.62 |
| 2014/0046764 | A1* | 2/2014 | Fox | G06Q 30/0257 |
| | | | | 705/14.55 |
| 2014/0052562 | A1* | 2/2014 | Oliveira | G06Q 30/0643 |
| | | | | 705/26.5 |
| 2014/0067564 | A1* | 3/2014 | Yuan | G06Q 30/0633 |
| | | | | 705/16 |
| 2014/0081853 | A1* | 3/2014 | Sanchez | G06Q 20/40 |
| | | | | 705/40 |
| 2014/0090045 | A1* | 3/2014 | Sanchez | G06Q 20/40 |
| | | | | 726/9 |
| 2014/0156470 | A1* | 6/2014 | Raman | G06F 3/0488 |
| | | | | 705/27.1 |
| 2014/0207680 | A1* | 7/2014 | Rephlo | H04B 5/0031 |
| | | | | 705/44 |

\* cited by examiner

SYSTEMS AND METHODS FOR FACILITATING ITEM SEARCHING AND LINKING TRANSACTIONS FUNCTIONALITY IN MOBILE COMMERCE

RELATED APPLICATIONS

This application claims priority to U.S. Ser. No. 61/699,728, titled "Systems and Methods for Implementing Mobile Commerce," filed on Sep. 11, 2012, and to U.S. Ser. No. 61/799,676, titled "Systems and Methods for Implementing Mobile Commerce," filed on Mar. 15, 2013, the entire contents of both are hereby incorporated by reference.

FIELD OF THE DISCLOSURE

The disclosure generally relates to mobile commerce, and more particularly, to systems and methods for facilitating item searching and linking transactions functionality in mobile commerce.

BACKGROUND

Commercial transactions to purchase certain goods and services are being implemented by consumers using mobile devices, such as smartphones. However, many commercial transactions are still cumbersome to implement since many conventional point-of-sale (POS) terminals and devices, payment processing systems, and smartphone interfaces are not configured for user-friendly transactions.

BRIEF DESCRIPTION OF THE DISCLOSURE

The disclosure relates to systems and methods for facilitating item searching and linking transactions functionality in mobile commerce.

In one embodiment, a method may be provided. The method may include a user device comprising one or more processors receiving an identification of an item from a user. The user device may receive one or more search parameters. The user device may facilitate a search for the item based at least in part on the identification of the item and the one or more search parameters. The user device may insert the item into a lifecycle shopping list.

In one aspect of an embodiment, the one or more search parameters may include one or more of a merchant type, a merchant location, a brand preference, a merchant preference, price thresholds, an estimated delivery time, an availability of the item, or an item rating associated with the item.

In one aspect of an embodiment, the method may include exporting, by the user device, the lifecycle shopping list.

In one aspect of an embodiment, the method may include annotating, by the user device, the item in the lifecycle shopping list.

In one aspect of an embodiment, the method may include storing, by the user device, the lifecycle shopping list to a remote server.

In one aspect of an embodiment, inserting the item into the lifecycle shopping list may further include scanning, by the user device, a code associated with the item.

In one aspect of an embodiment, the method may include publishing, by the user device, the lifecycle shopping list to a social network; and receiving, by the user device, comments from one or more users from the social network.

In one aspect of an embodiment, the method may include receiving, by the user device, a request to associate an artifact with a transaction in the lifecycle shopping list; receiving, by the user device, the artifact; associating, by the user device, the artifact with the transaction; and storing, by the user device, the artifact in association with the transaction.

In one aspect of an embodiment, the artifact may be one of a movie ticket, a warranty, boarding pass, a receipt, travel documents, product information, serial number, model number, or user guide.

In one aspect of an embodiment, receiving the artifact may further include capturing, by the user device, an image of the artifact.

In one aspect of an embodiment, receiving the artifact may further include receiving the artifact from a merchant.

In one aspect of an embodiment, the artifact and transaction may be stored in a remote server.

In one embodiment, a system may be provided. The system may include at least one memory storing computer-executable instructions; and at least one processor, wherein the at least one processor may be configured to access the at least one memory and to execute the computer-executable instructions to receive an identification of an item from a user; receive one or more search parameters; facilitate a search for the item based at least in part on the identification of the item and the one or more search parameters; and insert the item into a lifecycle shopping list.

In one aspect of an embodiment, the one or more search parameters may include one or more of a merchant type, a merchant location, a brand preference, a merchant preference, price thresholds, an estimated delivery time, an availability of the item, or an item rating associated with the item.

In one aspect of an embodiment, the at least one processor may be further configured to execute the computer-executable instructions to export the lifecycle shopping list.

In one aspect of an embodiment, the at least one processor may be further configured to execute the computer-executable instructions to annotate the item in the lifecycle shopping list.

In one aspect of an embodiment, the at least one processor may be further configured to execute the computer-executable instructions to store the lifecycle shopping list to a remote server.

In one aspect of an embodiment, wherein to insert the item into the lifecycle shopping list, the at least one processor may be further configured to execute the computer-executable instructions to scan a code associated with the item.

In one aspect of an embodiment, the at least one processor may be further configured to execute the computer-executable instructions to publish the lifecycle shopping list to a social network; and receive comments from one or more users from the social network.

In one aspect of an embodiment, the at least one processor may be further configured to execute the computer-executable instructions to receive a request to associate an artifact with a transaction in the lifecycle shopping list; receive the artifact; associate the artifact with the transaction; and store the artifact in association with the transaction.

In one aspect of an embodiment, wherein the artifact may be one of a movie ticket, a warranty, boarding pass, a receipt, travel documents, product information, serial number, model number, or user guide.

In one aspect of an embodiment, to receive the artifact, the at least one processor may be further configured to execute the computer-executable instructions to capture an image of the artifact.

In one aspect of an embodiment, to receive the artifact, the at least one processor may be further configured to execute the computer-executable instructions to receive the artifact from a merchant.

In one aspect of an embodiment, wherein the artifact and transaction may be stored in a remote server.

Some embodiments of the disclosure can have other aspects, elements, features, operations, acts, and steps in addition to or in place of what is described above. These potential additions and replacements are described throughout the rest of the specification.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
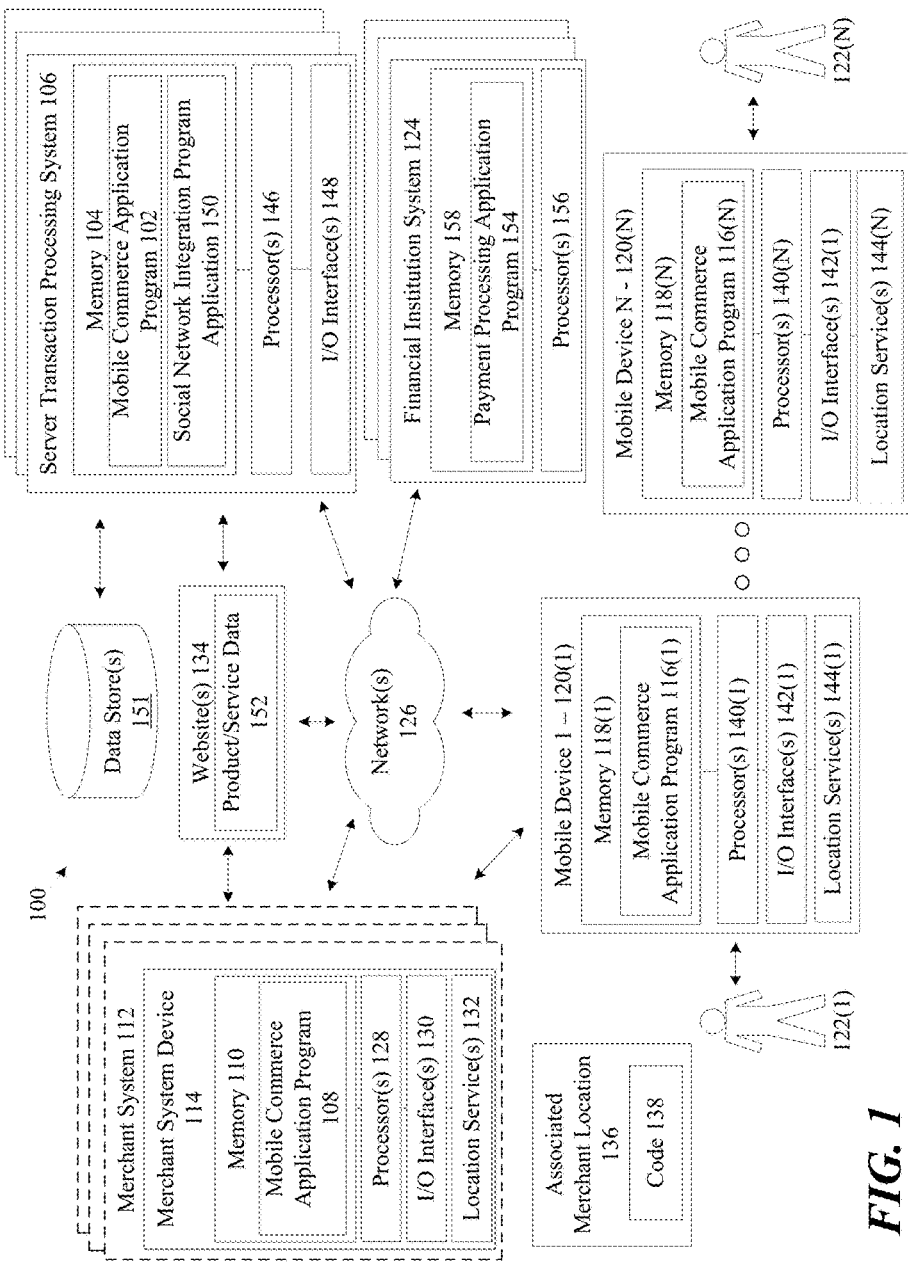
FIG. 1 is a block diagram including various hardware and software components of a system for facilitating item searching and linking transactions functionality in mobile commerce in accordance with one or more embodiments of the disclosure.

Certain embodiments of the disclosure will now be described more fully hereinafter with accompanying drawings and corresponding description in FIGS. 1-5. This disclosure may, however, be embodied in many different forms and should not be construed as limited to the embodiments set forth herein.

Overview

The disclosure relates to systems and methods for facilitating item searching and linking transactions functionality in mobile commerce. In one implementation, a mobile commerce application program, also known as a mobile wallet or wallet app, can be downloaded or other otherwise implemented by a consumer and/or merchant via a mobile device or client device, such as a smartphone, cellphone, wearable computer, or tablet computer. The mobile commerce application program can integrate both payment and loyalty functionality for use by merchants and consumers to facilitate payment and/or loyalty/reward transactions for goods and/or services, administer loyalty/reward programs, and receive loyalty/reward credit for a variety of activities, including, for instance, visiting certain merchants during certain days and/or times as well as purchasing goods and/or services. For example, according to certain embodiments of the disclosure, a consumer can download a wallet app to his or her smartphone or other mobile device, input and store payment device information in the wallet app, and then use the wallet app to pay a merchant for a movie ticket by transmitting an indication from the smartphone or other mobile device to the merchant. Using the payment device information, loyalty/reward credit can be generated by the merchant and credited to the consumer via a loyalty/reward program account for visiting the movie theater during an off-peak date/time as well as purchasing the movie ticket. The wallet app can generate an output via the consumer's smartphone or mobile device to reflect the loyalty/reward credit to the consumer's associated loyalty/reward program account as well as an electronic receipt for the consumer's movie ticket purchase. In this manner, loyalty/reward programs can become easier to use for consumers since the mobile commerce application can electronically track credits and various activities by the consumer can earn the consumer additional loyalty/reward credits. Further, different types of consumer loyalty can be rewarded, such as based on visits, spending, performing any number of activities (e.g., sending a friend an email or text, joining a loyalty/reward program, trying something new or different, etc.), or for ad-hoc reasons (e.g., late merchant service).

In another implementation, one or more tools can be provided by a mobile commerce application program to merchants and consumers to build closer ties between them or otherwise connect them through increased and more focused communications. For example, according to certain embodiments of the disclosure, a restaurant merchant can access, via a point of sale (POS) device or client device, a customized mobile commerce application or wallet app that has been downloaded to a consumer's mobile device or client device. When the restaurant merchant wants to communicate with its customers about news, upcoming events, and new menu items, such as announcing a special wine and cheese event for frequent customers. The restaurant merchant can access one or more tools to send notifications or messages to certain selected consumers via the wallet app on consumer's mobile devices or client devices. The tools can facilitate access to demographic and consumer data (spending, visits, etc.); filter data based on the demographic data, consumer data, and demographic and/or consumer groups; manage communication preferences (email, texts, notifications, etc.); and apply consumer preferences to selected communications Consumers could be selected based on, for instance, the number of restaurant visits in the past 30 days. In this manner, the merchant can target certain groups of consumers with focused messages and marketing campaigns, and thereby increase or otherwise improve merchant-consumer contact.

In yet another implementation, a mobile commerce application program can provide customized merchant applications to different merchants. For example, a local restaurant merchant may want to customize a wallet app or mobile commerce application program for downloading to or otherwise accessing via a consumer's mobile device or client device. The merchant can access another mobile commerce application program and utilize one or more tools to, for example, upload a merchant business logo, select parameters for a loyalty/reward program, and select data fields for obtaining consumer information or asking consumer questions. In any instance, after the merchant has customized a wallet app, consumers can access or otherwise download the app to their respective mobile devices or client devices, and initiate communications with the merchant via the customized wallet app. In certain other embodiments, a multi-merchant app can be provided to consumers for download to or access by a mobile device or client device. In that instance, consumers can have the ability to select from a list of merchants that communicate via the multi-merchant app. In certain other embodiments, a mobile commerce application program can provide services to any number of merchants who may have their own respective apps, and the mobile commerce application program can provide a variety of payment, communication, advertising, and loyalty/reward services through, for example, one or more application plug-ins that can interface between the merchant apps and the mobile commerce application program. In this manner, a merchant can customize consumers' payment and/or loyalty/rewards experiences through a wallet app or mobile commerce application program.

In the above implementations and other embodiments described herein, a mobile commerce application program, sometimes referred to as a wallet app, can be hosted or otherwise stored on a mobile device, client device, server device, or any other processor-based device. Multiple instances of mobile commerce application programs can operate within a network environment, such as described in FIG. 1, and each may have similar or different functionality, such as described in FIG. 2, according to various embodiments and implementations as described herein.

Example Implementations and Embodiments

An example architecture or environment for a system 100 according to various embodiments of the disclosure is shown in and described with respect to FIG. 1. A mobile commerce application program or module, such as 102, can be stored in memory 104 at a server device 106. In certain embodiments, a mobile commerce application program or module, such as 108, can be stored in memory 110 at a merchant system computer 112 or associated merchant device 114. In certain embodiments, a mobile commerce application program or module, such as 116(1), can be stored in memory 118(1) at a mobile device 120(1) associated with a consumer 122(1) or user. In any instance, one or more mobile commerce application programs or modules operating on respective computers, servers and/or mobile devices can implement some or all of the functionality described herein.

As shown in FIG. 1, the system 100 may include or otherwise support one or more merchant system computers 112 and/or associated merchant devices 114, one or more consumer or mobile devices 120(1)-120(N), one or more server transaction processing systems 106, and one or more issuer or financial institution systems 124. A wide variety of different types of consumer or mobile devices 120(1)-120(N) may be provided or otherwise supported, such as consumer computers and/or mobile communication devices. As desired, the system 100 may provide or otherwise support a wide variety of other entities associated with payment transactions, such as one or more server transaction processing systems 106. Any number of suitable networks and/or communication channels, such as the illustrated networks 126, may facilitate communication between various components of the system 100.

With reference to FIG. 1, any number of merchant system computers 112 and/or associated merchant devices 114 may be provided or otherwise supported. In certain embodiments, these merchant system computers 112 and/or associated merchant devices 114 may include one or more point-of-sale (POS) devices or terminals. As desired, each merchant system computer 112 and/or associated merchant device 114 may include any number of processor-driven devices, including but not limited to, a server computer, a mainframe computer, one or more networked computers, a desktop computer, a personal computer, a laptop computer, a mobile computer, a smartphone, a tablet computer, a wearable computer device, an application-specific circuit, or any other processor-based device.

A merchant system computer 112 and/or associated merchant device 114 may be any suitable device that facilitates purchase transactions, such as those in retail establishments, e-commerce and/or mobile transactions. In operation, the merchant system computer 112 and/or associated merchant device 114 may utilize one or more processors 128 to execute computer-readable instructions that facilitate the hosting of one or more mobile commerce application program services, the receipt of purchase transaction requests, and/or the processing of payment and/or loyalty/reward transactions. As a result of executing these computer-readable instructions, a special purpose computer or particular machine may be formed that facilitates the purchase and/or loyalty/reward transactions.

In addition to having one or more processors 128, the merchant system computer 112 and/or associated merchant device 114 may further include and/or be associated with one or more memory devices 110, input/output ("I/O") interface(s) 130, network interface(s), and/or location services 132. The memory 110 may be any computer-readable medium, coupled to the processor(s) 128, such as random access memory ("RAM"), read-only memory ("ROM"), and/or removable storage devices. The memory 110 may store a wide variety of data files and/or various program modules, such as an operating system ("OS"), one or more host modules, and/or one or more transaction modules or transaction applications, such as mobile commerce application program 108. The data files may include any suitable data that facilitates the operation of the merchant system computer 112 and/or associated merchant device 114, and/or interaction of the merchant system computer 112 and/or associated merchant device 114 with one or more other components (e.g., one or more consumer or mobile devices 120(1)-120(N), one or more server transaction processing systems 106, one or more merchant acquiring platforms, one or more issuer systems, one or more financial institution systems 124, etc.) of the system 100. For example, the data files may include information associated with one or more websites 134 (hosted by either a third party and/or merchant), webpages, inventory information associated with available products, acquiring platform information, service provider information, information associated with the generation of payment and/or loyalty/reward transactions and/or routing information for payment and/or loyalty/reward transactions.

The OS may be any suitable module that facilitates the general operation of the merchant system computer, as well as the execution of other program modules. For example, the OS may be, but is not limited to, Microsoft Windows®, Apple OSX™, Unix, a mainframe computer operating system (e.g., IBM z/OS, MVS, OS/390, etc.), or a specially designed operating system. The host modules may include any number of suitable host modules that manage interactions and communications between the merchant system computer 112 and/or associated merchant device 114, and external devices, such as the consumer or mobile devices 120(1)-120(N). For example, the host modules may include one or more Web server modules that facilitate the hosting of merchant websites and/or third party websites, such as 134, webpages, and/or transaction processing webpages. As another example, the host modules may include one or more cellular modules and/or systems that facilitate cellular communication with one or more mobile devices 120(1)-120(N).

The transaction modules or applications, such as the mobile commerce application program 108, may include any number of suitable software modules and/or applications that facilitate the collection and/or processing of information association with a purchase transaction, such as one or more identifiers of desired products (e.g., UPC identifiers) and/or services, a desired payment account, a desired type of transaction (e.g., a card present transaction, a card not present transaction, etc.), consumer identification information, and/or an identifier of a consumer or mobile device 120(1)-120(N) (e.g., a mobile device identifier, etc.). Based at least in part upon the collected information, the transaction modules or applications may generate and/or communicate a wide variety of transaction-related requests, such as payment processing and/or authorization requests and/or requests for one or more value added services ("VAS").

In one example embodiment, a transaction module, such as the mobile commerce application program 108, may receive a request for a purchase and/or loyalty/reward transaction (e.g., a request provided via a web page, etc.). As desired, the transaction module may identify available payment options that are presented to a consumer (e.g., credit account payment options, debit account payment options, stored value account payment options, card present e-commerce payment options, etc.), and a consumer selection of a payment option may be received. In the event that a card present transaction is requested, the transaction module may obtain a mobile device identifier, for example, via an established communications session with a consumer's mobile device or in response to requesting the mobile device identifier from the consumer. The transaction module may then invoke or request that a server transaction processing system 106 invoke one or more suitable applications on the mobile device, such as 120(1), (e.g., a wallet application, a mobile commerce application program, a transaction module, etc.) in order to receive validation information from the mobile device 120(1), such as an mPIN and/or a message (e.g., an encrypted message, etc.) derived from an mPIN and/or other information (e.g., a secure element identifier, an encryption key, etc.). The transaction module (or server transaction processing system) may then associate the validation information with a proposed transaction that is output for communication to an issuer system or financial institution system 124 associated with a selected payment account. For example, the transaction module may append and/or incorporate the validation information into a transaction authorization and/or settlement request. In this regard, the issuer system or financial institution system 124 may verify the validation information and determine whether a card present e-commerce transaction will be allowed.

As desired, prior to the output of a proposed transaction, the transaction module may invoke and/or request (e.g., request a server transaction processing system, etc.) the invocation of a wide variety of VAS associated with a transaction, such as the application of coupons, the award and/or redemption of loyalty rewards, etc. Additionally, in the event that the transaction is authorized, the transaction module may invoke and/or request the invocation of a wide variety of VAS following the transaction, such as receipt delivery services, product registration services, etc. Indeed, a wide variety of suitable operations may be performed by the transaction module.

One example of the operations that may be performed by a transaction module or mobile commerce application program 108 and/or the merchant system computer 112 and/or associated merchant device 114 is described in greater detail below with reference to FIG. 2.

With continued reference to the merchant system computer 112 and/or associated merchant device 114, the one or more I/O interfaces 130 may facilitate communication between the merchant system computer 112 and/or associated merchant device 114 and one or more input/output devices; for example, one or more user interface devices, such as a display, a keypad, a mouse, a pointing device, a gesture detection device, an eye movement detection device, a control panel, a touch screen display, a remote control, a microphone, a speaker, a consumer device reader, etc., that facilitate user interaction with the merchant system computer 112 and/or associated merchant device 114. The one or more network interfaces may facilitate connection of the merchant system computer 112 and/or associated merchant device 114 to one or more suitable networks, such as 126, and/or communication links. In this regard, the merchant system computer 112 and/or associated merchant device 114 may receive and/or communicate information to other components of the system 100, such as the consumer or mobile devices, for example 120(1)-120(N), the server transaction processing systems 106, and/or the issuer or financial institution systems 124.

In certain embodiments, a merchant system computer 112 and/or associated merchant device 114 can be associated with a merchant location 136, such as a retail store or "bricks and mortar"-type establishment. The merchant location 136 may include a code 138, such as a QR code, bar code, or other machine readable code, wherein consumers can utilize a respective consumer or mobile device to scan or read the code to obtain information associated with a merchant, such as a merchant loyalty/rewards program.

Additionally, with continued reference to FIG. 1, any number of consumer or mobile devices 120(1)-120(N) may be provided or otherwise supported. Examples of suitable consumer or mobile devices can include, but are not limited to, personal computers and/or mobile communication devices (e.g., mobile phones, smart phones, wearable devices, etc.), etc. According to an aspect of the disclosure, a consumer or mobile device, such as 120(1) may be a suitable device that is capable of interaction with other components of the system 100 during the request and/or completion of an e-commerce transaction. For example, a personal computer or mobile device may be utilized to access one or more e-commerce websites, such as 134, including those hosted by the merchant system computer, such as 112, identify products and/or services to be purchased, request a purchase and/or loyalty/reward transaction, and/or interact with the merchant system computer 112, merchant system device 114, and/or other components of the system 100 (e.g., the server transaction processing system 106, etc.) during the completion of a payment and/or loyalty/reward transaction. In one example embodiment, a mobile device, such as 120(1), may be utilized to request a payment and/or loyalty/reward transaction and/or to provide validation information during the processing of the payment and/or loyalty/reward transaction. In another example embodiment, a personal computer may be utilized to request a payment and/or loyalty/reward transaction, and communication may be established with a mobile device, such as 120(1), in order to facilitate provision of validation information.

As desired, a consumer or mobile device, such as 120(1), may be any number of processor-driven devices, including but not limited to, a personal computer, a mobile computer, an application-specific circuit, a minicomputer, a microcontroller, and/or any other processor-based device. The components of an example mobile device, such as 120(1), will now be described in greater detail, and it will be appreciated that a personal computer may include similar components. With reference to the mobile device 120(1), the mobile device 120(1) may utilize one or more processors 140(1) to execute computer-readable instructions that facilitate the general operation of the mobile device 120(1) (e.g., call functionality, etc.) and/or communication with a merchant system computer 112, merchant system device 114, and/or other components of the system 100 (e.g., the server transaction processing system 106) for payment and/or loyalty/reward transaction purposes. As a result of executing these computer-readable instructions, a special purpose computer or particular machine may be formed that facilitates the completion of payment and/or loyalty/reward transactions.

In addition to having one or more processors, the mobile device, such as 120(1)-120(N), may further include and/or be associated with one or more memory devices 118(1)-118(N), input/output ("I/O") interface(s) 142(1)-142(N), network interface(s), and/or location services 144(1)-144(N). The memory 118(1)-118(N) may be any computer-readable medium, coupled to the processor(s) 140(1)-140(N), such as random access memory ("RAM"), read-only memory ("ROM"), and/or removable storage devices. The memory 118(1)-118(N) may store a wide variety of data files and/or various program modules, such as an operating system ("OS") and/or one or more transaction modules or applications, such as a mobile commerce application program 116(1)-116(N). In certain embodiments, a mobile device, such as 120(1), may include one or more secure elements configured to securely store and/or access information, such as payment applications, payment account information, validation information (e.g., a stored mPIN, etc.), encryption information, and/or other transaction-related information. The secure elements may be stored in the memory 118(1) and/or included as a separate component of the mobile device 120(1). For example, a secure element may be a separate chip that is configured to communicate with primary computing functionality for the mobile device. As desired, one or more of the transaction modules, such as the mobile commerce application program 116(1), may be stored on a secure element. The transaction modules may be invoked by other components of the mobile device 120(1) and/or by one or more other components of the system 100, such as the merchant system computer 112, merchant system device 114, and/or the server transaction processing system 106.

The data files may include any suitable data that facilitates the operation of the mobile device, such as 120(1), and/or interaction of the mobile device 120(1) with one or more other components (e.g., a merchant system computer 112, merchant system device 114, a server transaction processing system 106, etc.) of the system 100. For example, the data files may include information associated with accessing the secure elements, information associated with invoking transaction modules, and/or information associated with accessing and/or processing validation data (e.g., an mPIN, etc.). The OS may be a suitable module that facilitates the general operation of the mobile device, such as 120(1), as well as the execution of other program modules. For example, the OS may be, but is not limited to, a suitable mobile OS or a specially designed operating system. As desired, the mobile device 120(1) may also include one or more suitable browser applications that facilitate the access of one or more webpages hosted by the merchant system computer 112, and/or third party or merchant websites, such as 134.

The transaction modules may include one or more suitable software modules and/or applications configured to facilitate purchase transactions, such as payment and/or loyalty/reward transactions, on behalf of the mobile device, such as 120(1). In certain embodiments, a transaction module or mobile commerce application program, such as 116(1), may also facilitate communication with a server transaction processing system, such as 106, or a trusted service manager. A wide variety of suitable techniques may be utilized to install a transaction module on the mobile device, such as 120(1). For example, a transaction module may be provisioned to the mobile device 120(1) by a server transaction processing system 106 and/or by an issuer or financial institution system 124. Additionally, during the installation and/or registration of the transaction module, a wide variety of validation information may be generated and/or identified. For example, a consumer, such as 122(1) may be prompted to enter an mPIN, such as a multi-character and/or multi-numeral code, to an associated mobile device, such as 120(1). As desired, the mPIN may be stored on a secure element. Additionally, the PIN and/or a wide variety of information derived from the mPIN (e.g., an encrypted mPIN, etc.) may be provided to one or more issuer or financial institution systems, such as 124, or an issuer system associated with an issuer of a payment account (e.g., a credit account, a debit account, a stored value account, etc.) that is associated with the transaction module.

According to an aspect of the disclosure, following registration and/or activation of the transaction module, the transaction module may be invoked during a payment and/or loyalty/reward transaction. For example, the transaction module may be invoked by a merchant system computer 112, merchant system device 114, or by a server transaction processing system 106 at the request of the merchant system computer 112 and/or merchant system device 114. In certain embodiments, the transaction module may be invoked following a consumer request to conduct a payment and/or loyalty/reward transaction and the identification of the mobile device, such as 120(1), by the merchant system computer 112, merchant system device 114, or server transaction processing system 106. Following the invocation of the transaction module, a request for validation data and/or payment and/or loyalty/reward account data may be received. As desired, the transaction module may prompt the consumer for entry of an mPIN, and an mPIN value entered by the consumer, such as 122(1), (e.g., by a keypad, touchscreen, etc.) may be identified. A stored mPIN value may then be accessed from the secure element and compared to the entered mPIN value. In this regard, the entered mPIN value may be authenticated. If the entered mPIN value is not authenticated, then the transaction module may reject a proposed transaction and direct the output of a suitable error message.

If, however, the entered mPIN value is authenticated, then the transaction module may provide payment account data and associated validation data to the merchant system computer 112, merchant system device 114, or server transaction processing system 106. A wide variety of different types of validation data may be provided as desired in various embodiments, including but not limited to, an mPIN entered by the consumer 122(1), an indication that the entered mPIN was authenticated by the mobile device 120(1) and/or the secure element, an encrypted version of the entered mPIN, and/or an encrypted version of the stored mPIN. In one example embodiment, an entered mPIN may be authenticated, encrypted, and provided to the merchant system computer (or a server transaction processing system). In this regard, the encrypted mPIN may be provided to the issuer or financial institution system, such as 124, for authentication and/or risk analysis purposes.

Examples of the operations of the transaction module and/or the mobile device are described in greater detail below with reference to the other figures.

The one or more I/O interfaces, such as 142(1)-142(N), may facilitate communication between the mobile device, such as 120(1) and one or more input/output devices; for example, one or more user interface devices, such as a display, a keypad, a touch screen display, a microphone, a speaker, etc., that facilitate user interaction with the mobile device 120(1). Further, the one or more network interfaces may facilitate connection of the mobile device, such as 120(1), to one or more suitable networks, for example, the network(s) 126 illustrated in FIG. 1. In this regard, the mobile device, such as 120(1), may receive and/or communicate information to other components of the system 100.

With continued reference to FIG. 1, as desired in various embodiments, any number of server transaction processing systems, such as 106, may be provided or otherwise supported. A server transaction processing system 106 may facilitate the backend processing of a purchase transaction, such as a payment and/or loyalty/reward transaction. In certain embodiments, an issuer system may include similar components as those discussed above for the merchant system computer 112 and/or merchant system device 114. For example, server transaction processing system 106 may include any number of processors 146, memories, I/O interfaces 148, and/or network interfaces. In certain embodiments, a server transaction processing system 106 can include one or more transaction modules, such as a mobile commerce application program 102 and/or a social network integration program application 150. In any instance, the transaction modules can facilitate communications and/or interactions with any number of consumer or mobile devices such as 120(1)-120(N), merchant computer systems such as 112, merchant computer devices 114, data stores 151, third party websites such as 134, and financial institution systems such as 124. In certain embodiments, a service transaction processing system, such as 106, can host a social network integration program application, such as 150, configured to communicate via any number of social network services and/or websites to obtain information from the services and/or websites, for example, product and/or service data 152 on a third party or merchant website, such as 134.

Furthermore, as desired, a server transaction processing system, such as 106, may provide a wide variety of transaction module provisioning services. Additionally, a server transaction processing system, such as 106, may provide a wide variety of transaction-related and/or value added services ("VAS") in association with transactions, such as coupon redemption services, loyalty/reward services, location-based services, electronic receipt services, product registration services, warranty services, coupon issuance services, and/or the routing of a proposed transaction to an issuer for approval and/or settlement purposes. In certain embodiments, a server transaction processing system, such as 106, may include similar components as those discussed above for the merchant system computer, such as 112, and/or merchant system device, such as 114. For example, a server transaction processing system, such as 106, may include any number of processors, memories, I/O interfaces, and/or network interfaces.

With continued reference to FIG. 1, as desired in various embodiments, any number of issuer or financial institution systems, such as 124, may be provided or otherwise supported. An issuer or financial institution system, such as 124, may facilitate the backend processing of a payment and/or loyalty/reward transaction, such as a payment for an e-commerce transaction. For example, an issuer or financial institution system, such as 124, may host a payment processing application program, such as 154, or module to facilitate the approval, authentication, and/or settlement of a payment transaction. In certain embodiments, a payment transaction may be routed to an issuer or financial institution system, such as 124, via a suitable transaction network (e.g., a debit network, a credit network, etc.), and the issuer or financial institution system, such as 124, may evaluate the payment transaction via the payment processing application program, such as 154, or module. An approval or rejection of the payment transaction may then be output for communication to a merchant system computer, such as 112, and/or merchant system device 114. The issuer or financial institution system, such as 124, may then facilitate the settlement of the payment transaction. In certain embodiments, an issuer or financial institution system, such as 124, may include similar components as those discussed above for the merchant system computer 112 and/or merchant system device 114. For example, an issuer or financial institution system, such as 124, may include any number of processors 156, memories 158, I/O interfaces 160, and/or network interfaces.

In certain embodiments of the disclosure, an issuer or financial institution system, such as 124, may receive validation information in association with a purchase and/or loyalty/reward transaction.

A wide variety of suitable networks, individually and/or collectively shown as 126 in FIG. 1, may be utilized in association with embodiments of the disclosure. Certain networks may facilitate use of a wide variety of e-commerce-related communication. For example, one or more telecommunication networks, cellular networks, wide area networks (e.g., the Internet), and/or other networks may be provided or otherwise supported. Other networks may facilitate communication of transaction-related communications. For example, one or more transaction networks, such as branded networks (e.g., a VISA network, etc.), debit and/or PIN networks, and/or a wide variety of other suitable transaction networks may facilitate communication of transaction-related communications, such as e-commerce transactions. Due to network connectivity, various methodologies as described herein may be practiced in the context of distributed computing environments. It will also be appreciated that the various networks may include a plurality of networks, each with devices such as gateways and routers for providing connectivity between or among networks. Additionally, instead of, or in addition to, a network, dedicated communication links may be used to connect various devices in accordance with an example embodiment.

The system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. Accordingly, embodiments of the disclosure should not be construed as being limited to any particular operating environment, system architecture, or device configuration.

Figure 2:
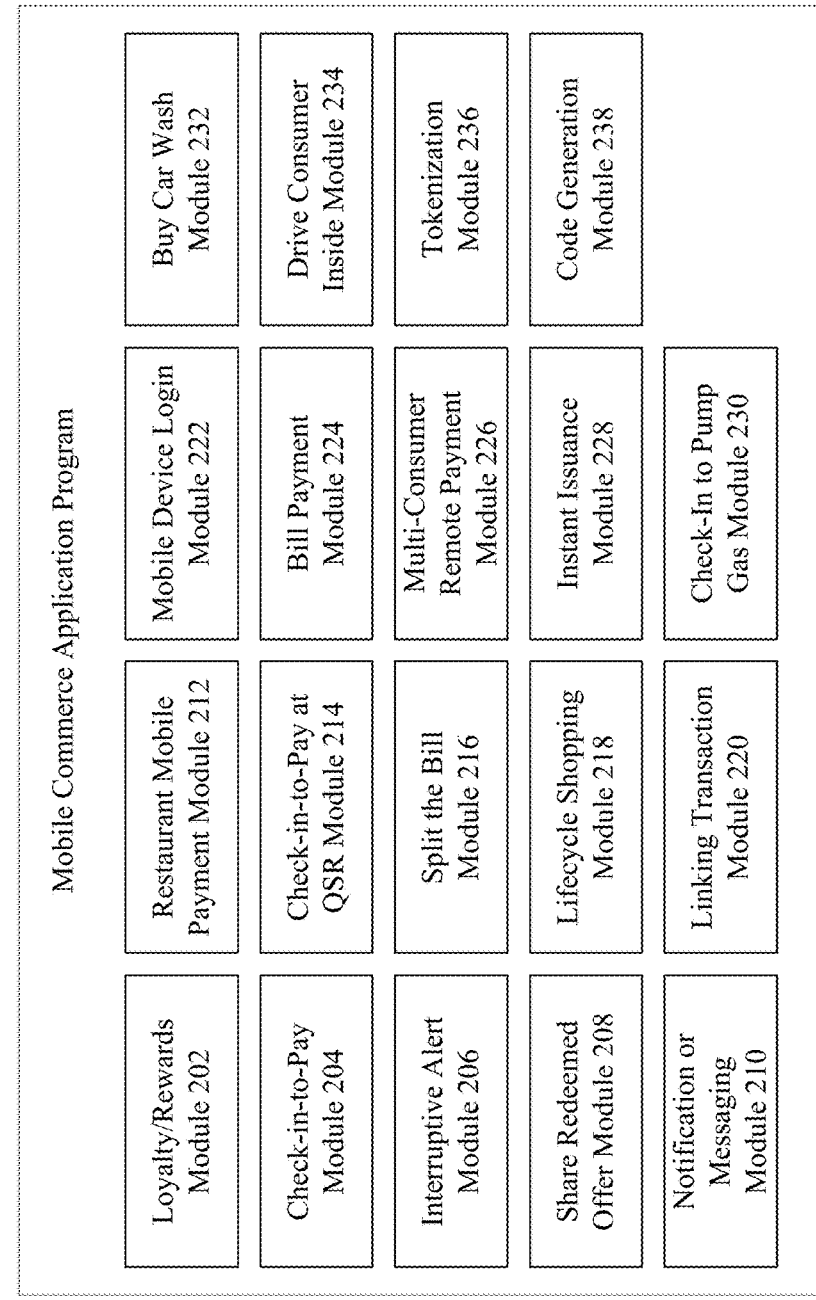
FIG. 2 is a block diagram that illustrates an example mobile commerce program application or module in accordance with one or more embodiments of the disclosure.
Figure 3:
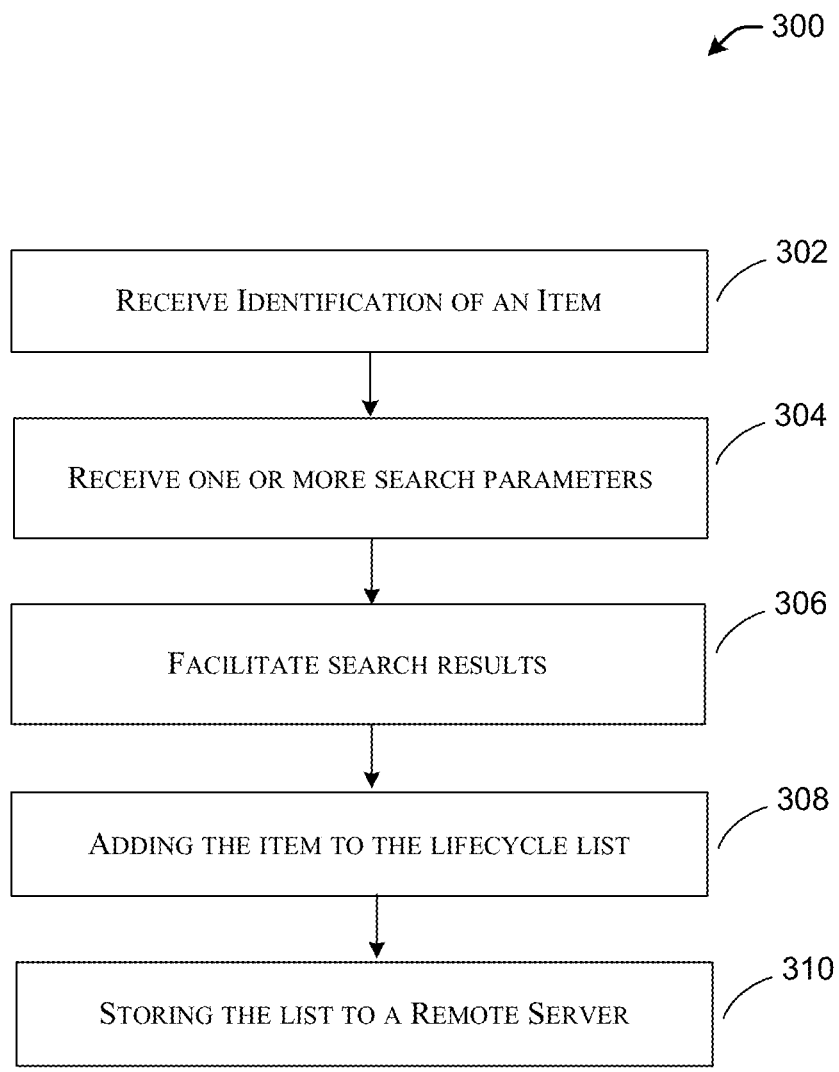
FIG. 3 is a process flow diagram of an illustrative method for creating a lifecycle shopping list in accordance with one or more embodiments of the disclosure.
Figure 5:
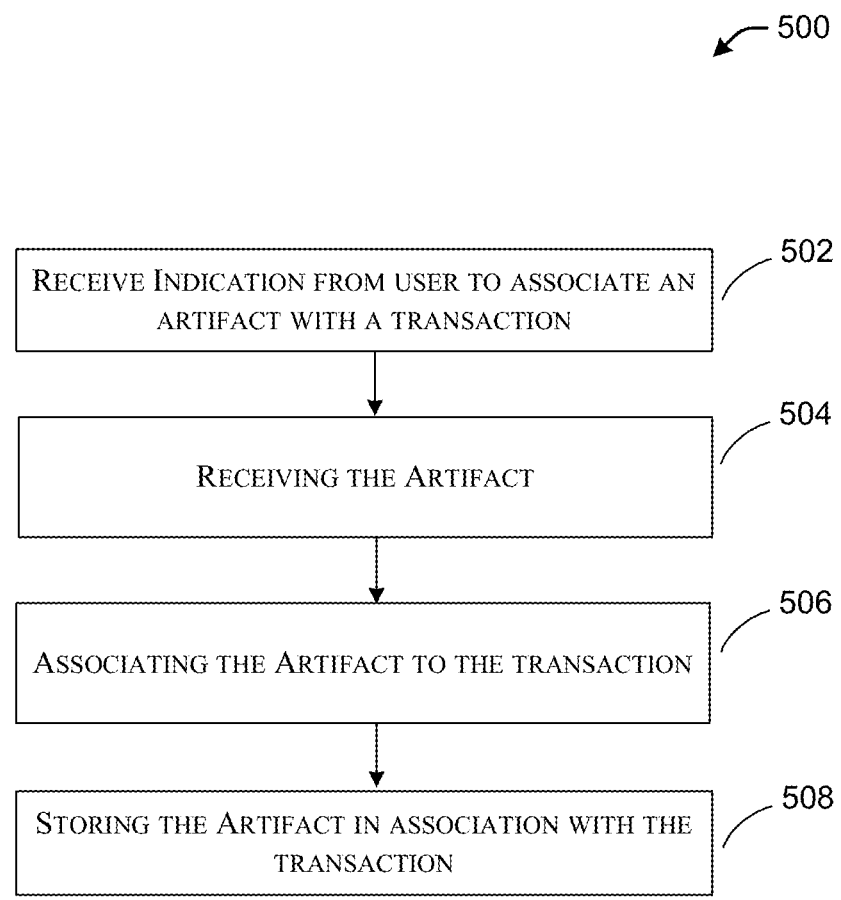
FIG. 5 is a process flow diagram of an illustrative method for digitally linking transaction information in accordance with one or more embodiments of the disclosure.

FIG. 2 shows an example mobile commerce application program 200, similar to the mobile commerce application programs 102, 108, and 116(1)-116(N) in FIG. 1 that can operate with respect to the system 100 shown in FIG. 1. The mobile commerce application program 200 shown in FIG. 2 can include, for example, a loyalty/rewards module 202, a check-in-to-pay module 204, an interruptive alert module 206, a share redeemed offer module 208, a notification or messaging module 210, a restaurant mobile payment module 212, a check-in-to-pay at QSR module 214, a split the bill module 216, a lifecycle shopping module 218, a linking transaction module 220, a mobile device login module 222, a bill payment module 224, a multi-consumer remote payment module 226, an instant issuance module 228, a check-in to pump gas module 230, a buy car wash module 232, a drive consumer inside module 234, a tokenization module 236, and a code generation module 238. Some or all of the modules 202-238 are described herein with respect to certain mobile commerce functionality, associated processes, and features. FIGS. 3 and 5 illustrate certain processes associated with some or all of the modules comprising the example mobile commerce application program 200 in FIG. 2.

While the various modules 202-238 are shown by way of example, fewer or greater numbers of modules can be present in various embodiments of a mobile commerce application program. Furthermore, various functionality described with respect to one module may be performed by multiple modules in other embodiments of the disclosure.

Lifecycle Shopping List

In some instances, consumers desire to make purchases using their mobile devices 120(1)-120(N). Certain embodiments of the disclosure can provide systems and processes for providing lifecycle shopping lists, such as providing shopping list-type functionality that evolves over a lifecycle of shopping. For example, a lifecycle shopping module 218 can combine items a consumer may want to buy and items the consumer has previously purchased. For the items the consumer may want to buy, the lifecycle shopping module 218 can bring together, for instance, the best online prices at different merchants and at nearby local merchants. The consumer may add items to purchase from either selecting online browsed items or by scanning an associated barcode or QR code for an item in a store. The lifecycle shopping module 218 can facilitate comparison shopping across any number of merchants, saving items of interest for the consumer, and ultimately provides purchase functionality to the consumer.

In one embodiment, by way of a mobile device 120(1) or other client device, such as a laptop computer or tablet, a consumer can initiate a lifecycle shopping list feature in a payment application program or app accessible via the consumer's mobile device 120(1) or other client device. For example, in a payment application or app accessible via the consumer's mobile device or other client device, a set of computer-executable instructions can be configured to receive an indication from the consumer for one or more items for possible purchase, and can be further configured to receive a list of previously purchased items by the consumer from a lifecycle shopping module 218. Based at least in part on inputs from the consumer regarding consumer preferences for merchant location, prices, etc., the lifecycle shopping module 218 can output a list of merchant locations and online locations for a particular item the consumer may desire to purchase. In some embodiments, multiple lists can be output for the consumer, and the lists can be organized by item type, classification, etc. Further, the lifecycle shopping module 218 can access or otherwise store previously purchased items by the consumer for subsequent access by the consumer to purchase information, including date, price, merchant, merchant location, online location, etc. In some embodiments, the lifecycle shopping module 218 may track any number of product SKUs and other data associated with items, products, etc.

Using some or all of the above systems and processes, functionality for lifecycle shopping can be enabled. In this manner, consumers can better manage purchase lists as well as consumer spending, and be better informed about prior purchase information that may affect the consumer's decision to complete a purchase transaction.

The systems and methods described herein may enable shoppers to specify key product requirements in their search, such as price, location, time of delivery, availability, product rating, retailer rating, and/or brand preferences. Shoppers may be able to see options available from different merchants with detail to help make their decisions. Such options may include cost (product and shipping), time to receive the item if the item is purchased from an online retailer, availability of item (e.g., in stock, available at a different store, on backorder, etc.) and rewards, coupons, or other offers that may apply in their purchase of the item. Shoppers may be able to directly purchase items online or, if local, purchase and reserve items for pickup. In some embodiments, a map of the merchant location or merchant contact information may also be provided. The lifecycle shopping module 218 may enable users to collect and access information on multiple devices etc. over time. For example, the information may be available via a computer website, mobile device, television, in-store, chats, and recommendations and information from friends and/or social networks. The information may be made available to the user to support decision-making processes by enabling research, comparisons, annotations, and exporting of the information to different formats.

FIG. 3 is a process flow diagram of an illustrative method 300 for creating a lifecycle shopping list in accordance with one or more embodiments of the disclosure. Various operations of the methods described below can be performed by the system components described above and shown in FIGS. 1 and 2. At block 302, a lifecycle shopping module 218 of a mobile device 120(1) may receive an indication from a user identifying an item they would like to purchase. The user may identify the item by typing the name of the item in a search field or by clicking from a list of items, scanning a code (e.g., QR code, barcode, etc.) or the like.

At block 304, the lifecycle shopping module 218 of the mobile device 120(1) may receive one or more search parameters from a user. The user may specify price thresholds (e.g., maximum price, minimum price, average price, etc.), location of item, time of delivery, availability, product rating, retailer rating, and/or brand preferences.

At block 306, the lifecycle shopping module 218 of the mobile device 120(1) may facilitate a search based at least in part on the identified item and the one or more search parameters. The search may enable the user to search for an item across different types of retailers and according to many different parameters.

At block 308, the lifecycle shopping module 218 of the mobile device 120(1) may add the item selected by the user from the search results to the lifecycle shopping list generated by the lifecycle shopping module 218. In some embodiments, items may be added manually, by a scan of a code associated with a list, by a hyperlink from a merchant, or the like.

At block 310, the lifecycle shopping module 218 of the mobile device 120(1) may store the list to a remote server. By storing the list to the cloud, the system may enable the user to access the list from different devices and websites while enabling the list to remain up to date.

In some embodiments, the lifecycle shopping module 218 of the mobile device 120(1) may enable publishing the lifecycle shopping list to a social network. In some embodiments, people associated with the user on the social network may comment and provide feedback regarding the list or one or more items on the list. In some embodiments, the comments and feedback may be stored in association with the list.

In some embodiments, the lifecycle shopping module 218 of the mobile device 120(1) may enable exporting the lifecycle shopping list. For example, the user device may export the list to a spreadsheet, database, table or the like. The ability to export the list may facilitate the user's ability to further annotate the list or share the list with other people.

Figure 4:
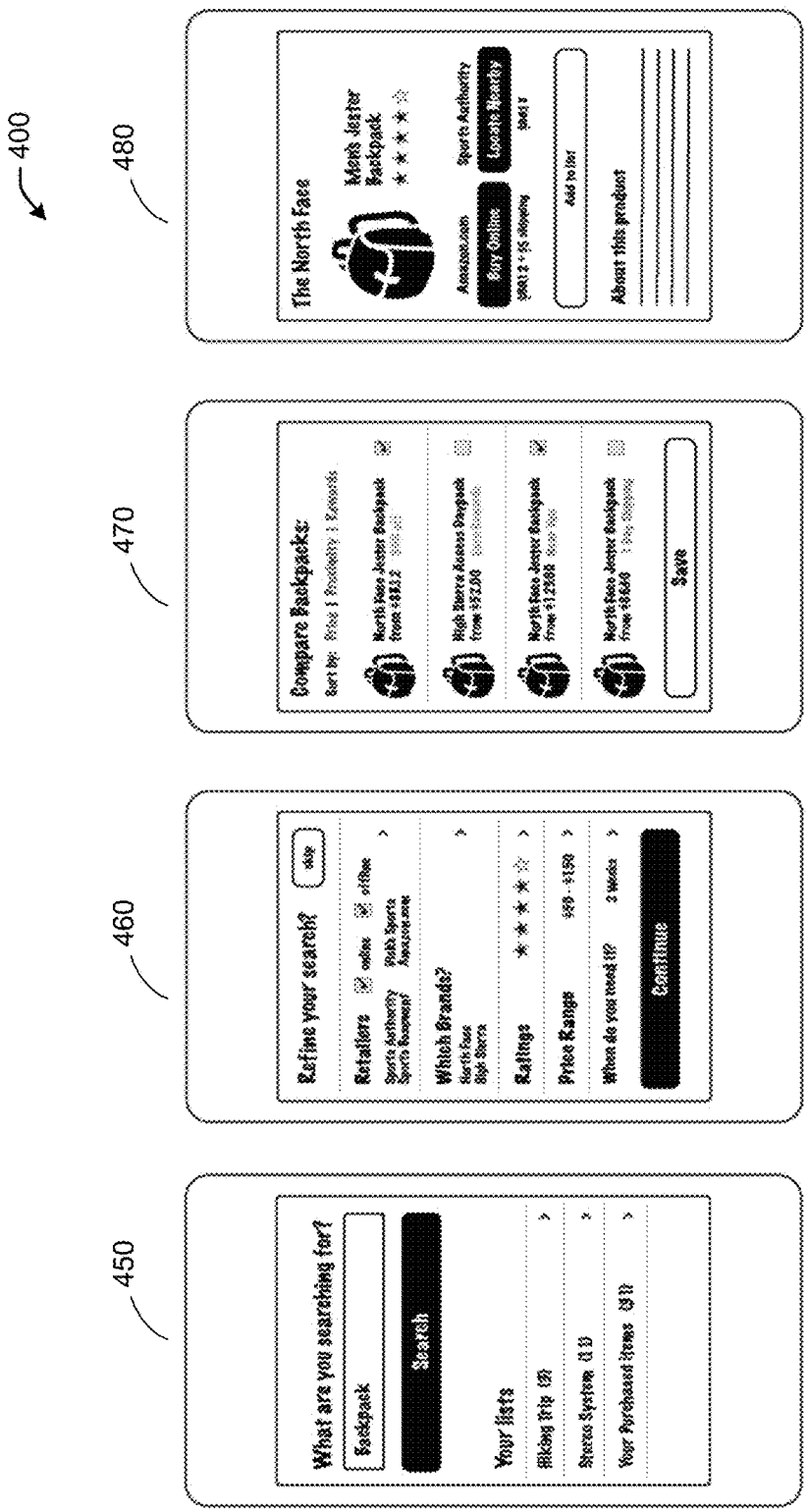
FIG. 4 is a diagram that depicts example user interfaces for creating a lifecycle shopping list in accordance with one or more embodiments of the disclosure.

Now referring to FIG. 4, a series of user interfaces for a lifecycle shopping list are depicted in accordance with an embodiment of the disclosure. 450 depicts a user interface on a mobile device 120(1) generated by a lifecycle shopping module 218 displaying existing lifecycle lists and a search field to enable a user to being their search for an item. 460 depicts a user interface generated by the lifecycle shopping module 218 that allows a user to refine their search by specifying specific parameters, such as preferred retailers, brands, prince range, and time range of when the item is needed. The systems and methods described herein may enable a user to search both online retailers and stores proximate to the user. 470 depicts an interface generated by the lifecycle shopping module 218 displaying the results of the search conducted by the user. 480 depicts an interface generated by the lifecycle shopping module 218 that displays details of a selected item from the search results. 480 may display information associated with retailers that may have the selected item.

The lifecycle shopping module 218 enables user to track items they have purchased or hope to purchase. The lifecycle shopping module 218 may enables users to query different merchants to research items and as well as enable quick additions to the list. For example, a user may be able to scan a code in a store or online to add a product to the lifecycle list without having to manually search and enter information associated with the item.

Using some or all of the above systems and processes, a technical solution for providing lifecycle shopping lists can be enabled. In certain embodiments, technical solutions for providing lifecycle shopping lists, such as providing shopping list-type functionality that evolves over a lifecycle of shopping can be implemented.

Linking Associated transaction Information

In some instances, consumers desire to make purchases. Certain embodiments of the disclosure can provide systems and processes for linking associated transaction information, such as facilitating the ability to store information and/or artifacts related to a transaction with the transaction, and access the information and/or artifacts via a mobile phone when used to make transactions. For example, information and/or artifacts associated with a transaction for a vacation may include movie tickets, train tickets, purchase receipts, item warranty information, user guides, item model numbers, serial numbers, etc. so as to make the information relatively easy to retrieve and access at a later time.

In one embodiment, by way of a mobile device 120(1) or other client device, such as a laptop computer or tablet, a consumer can initiate a linking transaction module 220 in a payment application program accessible via the consumer's mobile device or other client device. For example, in a payment application or app accessible via the consumer's mobile device or other client device, a set of computer-executable instructions can be configured to receive an indication from the consumer for one or more purchased and/or viewable items to be linked, and can be further configured to output a link to one or more of the purchased and/or viewable items for viewing by the consumer via the mobile device or other client device. Based at least in part on inputs from the consumer regarding consumer preferences for linking items, or based at least in part on predefined links between items, the linking application program can output a list of links to items associated with a purchased or viewable item. For example, a consumer may purchase movie tickets with a payment application program or app accessible via the consumer's mobile device or other client device. In viewing a purchased item list in the payment application program or app, the consumer may view and select a link or button to the movie tickets, which can be provided by a linking application program. By way of further example, a consumer may purchase airline tickets with a payment application program or app accessible via the consumer's mobile device or other client device. In viewing a purchased item list in the payment application program or app, the consumer may view and select a link or button to an airline boarding pass associated with the airline tickets, which can be provided by a linking application program. Further, a consumer may purchase a backpack with a payment application program or app accessible via the consumer's mobile device or other client device. In viewing a purchased item list in the payment application program or app, the consumer may view and select respective links or buttons to a purchase receipt, warranty information, and instruction manual associated with the backpack, all of which can be provided by a linking application program. Further, the lifecycle shopping application program can access or otherwise store previously purchased items by the consumer for subsequent access by the consumer to purchase information, including date, price, merchant, merchant location, online location, etc.

In one embodiment, a linking transaction module 220 can interface with a list of consumer purchases, and provide links or buttons for some or all of the listed items with available associated transaction information. The linking transaction module 220 may access any number of databases or websites hosted by merchants, vendors, manufacturers, and/or service providers to provide available associated transaction information. When available associated transaction information is identified by the linking transaction module 220, the linking transaction module 220 can, when needed, output a link or button to the available associated transaction information adjacent to relevant consumer purchase information.

Using some or all of the above systems and processes, functionality for linking associated transaction information can be enabled. In this manner, consumers can better manage associated transaction information for purchases and be better informed about the purchases, which can enhance the consumer purchase experience.

FIG. 5 is a process flow diagram of an illustrative method 500 for digitally linking transaction information in accordance with one or more embodiments of the disclosure. Various operations of the methods described below can be performed by the system components described above and shown in FIGS. 1 and 2. In brief overview, at block 502, a linking transaction module 220 of a mobile device 120(1) may receive an indication from a user to associate an artifact with a transaction. At block 504, the linking transaction module 220 of the mobile device 120(1) may receive the artifact. At block 506, the linking transaction module 220 of the mobile device 120(1) may associate the artifact with the transaction. At block 508, the artifact may be stored in association with the transaction by the linking transaction module 220 of the mobile device 120(1).

At block 502, the linking transaction module 220 of the mobile device 120(1) may receive an indication from a user to associate an artifact with a transaction. An artifact may be any information or document that may be relevant to the transaction. Examples of artifacts may include movie tickets, product warranty information, airline boarding pass, a purchase receipt, travel documents, product information, serial number, model number, registration code, user guide, or the like.

At block 504, the linking transaction module 220 of the mobile device 120(1) may receive the artifact. In some embodiments, a user may upload a document or image. For example, a user may purchase movie tickets that may have been emailed to them. The user may locally save the movie tickets and then upload them to the system. In some embodiments, the user may capture an image of the artifact. For example, the user may take a picture of a document or product to associate with the transaction. In some embodiments, the system may receive a pass from the merchant or a website containing information the user wishes to associate with the transaction. The user may receive an email containing information and the email may comprise a hyperlink. When clicked, the hyperlink may present the user with a pass which may be downloaded and entered into the system. In some embodiments, merchants may upload the artifact, such as a receipt or warranty information to the system directly and the artifact may be automatically associated with the transaction.

At block 506, the linking transaction module 220 of the mobile device 120(1) may associate the artifact with the transaction. The linking transaction module 220 of the mobile device 120(1) may create a link or otherwise associate the artifact with the transaction. In some embodiments, the linking transaction module 220 of the mobile device 120(1) may generate a unique identifier to be associated with the transaction and the artifact.

At block 508, the artifact may be stored in association with the transaction by the linking transaction module 220 of the mobile device 120(1). In some embodiments, the artifact may be stored locally on the mobile device 120(1). In some embodiments, the artifact and the transaction may be stored on a remote server accessible by the mobile device 120(1).

Using some or all of the above systems and processes, technical solutions for linking associated transaction information can be implemented. For example, technical solutions for linking associated transaction information, such as facilitating the ability to store information and/or artifacts related to a transaction with the transaction, and accessing the information and/or artifacts via a mobile phone when used to make transactions can be implemented.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A computer-implemented method comprising:
receiving, by a user device comprising one or more processors, an identification of an item from a user;
receiving, by the user device, one or more search parameters, wherein the one or more search parameters comprise at least a predefined time range of when the item is needed at a future date or time;
facilitating, by the user device, a search for the item based at least in part on the identification of the item and the one or more search parameters;
inserting, by the user device, the item to a lifecycle shopping list, wherein the lifecycle shopping list comprises one or more previously purchased items;
determining, by the user device, information associated with the one or more previously purchased items, wherein the information is indicative of one or more value added services (VAS) associated with the one or more previously purchased items;
publishing, by the user device, the information to a social network;
receiving, by the user device, one or more user comments regarding the information via the social network;
identifying, by the user device, a transaction for the item, wherein the transaction for the item is associated with the one or more VAS;
associating, by the user device, at least one artifact with the transaction for the item, wherein the at least one artifact comprises a purchase receipt for the item and the one or more user comments regarding the information via the social network; and
outputting, by the user device, a graphical user interface (GUI) that comprises an indication of the lifecycle shopping list that includes the transaction for the item and the at least one artifact.

2. The computer-implemented method of claim 1, wherein the one or more search parameters may comprise one or more of: a merchant type, a merchant location, a brand preference, a merchant preference, price thresholds, estimated delivery time, availability of the item, or item rating.

3. The computer-implemented method of claim 1, further comprising:
exporting, by the user device, the lifecycle shopping list.

4. The computer-implemented method of claim 1, further comprising:
annotating, by the user device, the item in the lifecycle shopping list.

5. The computer-implemented method of claim 1, further comprising:
storing, by the user device, the lifecycle shopping list to a remote server.

6. The computer-implemented method of claim 1, wherein inserting the item to the lifecycle shopping list further comprises:
scanning, by the user device, a code associated with the item.

7. The computer-implemented method of claim 1, wherein associating, by the user device, the at least one artifact with the transaction for the item comprises:
receiving, by the user device, a request to associate the at least one artifact with the transaction for the item;
receiving, by the user device, the at least one artifact; and
storing, by the user device, the at least one artifact in association with the transaction for the item.

8. The computer-implemented method of claim 1, wherein the at least one artifact further comprises a movie ticket, a warranty, boarding pass, a receipt, travel documents, product information, serial number, model number, or user guide.

9. The computer-implemented method of claim 7, wherein receiving the at least one artifact further comprises:
capturing, by the user device, an image of the at least one artifact.

10. The computer-implemented method of claim 7, wherein receiving the at least one artifact further comprises:
receiving the at least one artifact from a merchant.

11. The computer-implemented method of claim 1, wherein the at least one artifact and the transaction for the item are stored in a remote server.

12. A system comprising:
at least one memory storing computer-executable instructions; and
at least one processor, wherein the at least one processor is configured to access the at least one memory and to execute the computer-executable instructions to:
receive an identification of an item from a user;
receive one or more search parameters, wherein the one or more search parameters comprise at least a predefined time range of when the item is needed at a future date or time;
facilitate a search for the item based at least in part on the identification of the item and the one or more search parameters;
insert the item to a lifecycle shopping list, wherein the lifecycle shopping list comprises one or more previously purchased items;
determine information associated with one or more previously purchased items by the user, wherein the information is indicative of one or more value added services (VAS) associated with the one or more previously purchased items;
publish the information to a social network;
receive one or more user comments regarding the information via the social network;
identify a transaction for the item, wherein the transaction for the item is associated with the one or more VAS;
associate an artifact with the transaction for the item, wherein the artifact is a purchase receipt for the item and the one or more user comments regarding the information via the social network; and
output a graphical user interface (GUI) that comprises an indication of the lifecycle shopping list that includes the transaction for the item and the artifact.

13. The system of claim 12, wherein the one or more search parameters comprise one or more of: a merchant type, a merchant location, a brand preference, a merchant preference, price thresholds, an estimated delivery time, an availability of the item, or an item rating associated with the item.

14. The system of claim 12, wherein the at least one processor is further configured to execute the computer-executable instructions to:

export the lifecycle shopping list.

15. The system of claim 12, wherein the at least one processor is further configured to execute the computer-executable instructions to:

annotate the item in the lifecycle shopping list.

16. The system of claim 12, wherein the at least one processor is further configured to execute the computer-executable instructions to:

store the lifecycle shopping list to a remote server.

17. The system of claim 12, wherein the at least one processor is further configured to execute the computer-executable instructions to:

scan a code associated with the item.

18. The system of claim 12, wherein to associate the artifact with the transaction for the item, the at least one processor is further configured to execute the computer-executable instructions to:

receive a request to associate the artifact with the transaction for the item;

receive the artifact; and store the artifact in association with the transaction for the item.

19. The system of claim 12, wherein the artifact further comprises a movie ticket, a warranty, boarding pass, a receipt, travel documents, product information, serial number, model number, or user guide.

20. The system of claim 18, wherein to receive the artifact, the at least one processor is further configured to execute the computer-executable instructions to:

capture an image of the artifact.

21. The system of claim 18, wherein to receive the artifact, the at least one processor is further configured to execute the computer-executable instructions to:

receive the artifact from a merchant.

22. The system of claim 12, wherein the artifact and transaction for the item are stored in a remote server.

* * * * *